United States Patent
Höglund et al.

(10) Patent No.: US 11,078,855 B2
(45) Date of Patent: Aug. 3, 2021

(54) INTERNAL COMBUSTION ENGINE AND METHOD FOR CONTROLLING SUCH AN INTERNAL COMBUSTION ENGINE

(71) Applicant: FREEVALVE AB

(72) Inventors: Anders Höglund, Munka Ljungby (SE); Urban Carlson, Helsingborg (SE)

(73) Assignee: FREEVALVE AB, Ängelholm (SE)

( * ) Notice: Subject to any disclaimer, the term of this patent is extended or adjusted under 35 U.S.C. 154(b) by 0 days.

(21) Appl. No.: 16/645,895

(22) PCT Filed: Sep. 10, 2018

(86) PCT No.: PCT/SE2018/050902
§ 371 (c)(1),
(2) Date: Mar. 10, 2020

(87) PCT Pub. No.: WO2019/050463
PCT Pub. Date: Mar. 14, 2019

(65) Prior Publication Data
US 2020/0277909 A1    Sep. 3, 2020

(30) Foreign Application Priority Data
Sep. 11, 2017    (SE) .................................. 1751096-7

(51) Int. Cl.
*F02D 41/02*    (2006.01)
*F02B 75/02*    (2006.01)
(Continued)

(52) U.S. Cl.
CPC ............ *F02D 41/024* (2013.01); *F02B 75/02* (2013.01); *F02D 13/0215* (2013.01);
(Continued)

(58) Field of Classification Search
CPC ............ F02D 41/0245; F02D 13/0261; F02D 41/0002; F02D 41/0035; F02D 13/0215;
(Continued)

(56) References Cited

U.S. PATENT DOCUMENTS 9,885,261 B2    2/2018    Hoglund
9,964,006 B2    5/2018    Hoglund
(Continued)

FOREIGN PATENT DOCUMENTS

DE    202013010403    2/2015
EP    0826870    3/1998
(Continued)

OTHER PUBLICATIONS

International Search Report, PCT/SE2018/050902, dated Nov. 22, 2018.
(Continued)

*Primary Examiner* — Sizo B Vilakazi
(74) *Attorney, Agent, or Firm* — Nixon & Vanderhye

(57) ABSTRACT

An internal combustion engine includes combustion chambers, each having a controllable intake valve controlling an intake port, a controllable exhaust valve controlling an exhaust port, a piston, and a fuel injector. An intake manifold is connected to the intake port of each chamber. In catalytic converter warm-up mode, each chamber is driven in four-stroke operation including a 720 crank angle degrees cycle, and opens the intake port, starting to open in 90-180 CAD, and fully closes the intake port in 180-270 CAD, opens the exhaust port during the power stroke, starting in 405-495 CAD, opens the intake port during the exhaust stroke, starting in 610-690 CAD, and fully closes the exhaust port during the exhaust stroke in 630-710 CAD. Exhaust gas is forced into the intake manifold by the piston, mixing fuel
(Continued)

and exhaust in the intake manifold, and fully closes the intake port in 700 to 720+20 CAD.

20 Claims, 2 Drawing Sheets

(51) Int. Cl.
*F02D 13/02* (2006.01)
*F02M 35/10* (2006.01)
*F02M 61/14* (2006.01)

(52) U.S. Cl.
CPC .... *F02M 35/10222* (2013.01); *F02M 61/145* (2013.01); *F02B 2075/027* (2013.01)

(58) Field of Classification Search
CPC .... F02D 41/024; F02D 41/06; F02D 13/0219; F02D 13/02; F02D 41/345; F02D 41/068; F02D 2041/001; F02M 61/145; F02M 26/01; F02M 35/10222; F02B 37/18; F02B 75/02; F02B 2075/027; Y02T 10/40; Y02T 10/12; F01L 9/026; F01L 9/02
See application file for complete search history.

(56) References Cited

U.S. PATENT DOCUMENTS

| | | | |
|---|---|---|---|
| 2003/0005898 A1 | 1/2003 | Gianolio et al. | |
| 2003/0154964 A1* | 8/2003 | Gaessler | F02D 13/0207 |
| | | | 123/568.14 |
| 2003/0183185 A1 | 10/2003 | Sun et al. | |
| 2015/0184558 A1* | 7/2015 | Hoglund | F01L 1/24 |
| | | | 123/90.12 |
| 2015/0300245 A1 | 10/2015 | Korenaga | |
| 2016/0040564 A1* | 2/2016 | Hoglund | F01L 9/026 |
| | | | 251/28 |
| 2016/0369666 A1* | 12/2016 | Hoglund | F01L 9/021 |

FOREIGN PATENT DOCUMENTS

| | | |
|---|---|---|
| FR | 2 918 704 A3 | 1/2009 |
| FR | 3 044 359 A1 | 6/2017 |
| JP | 2001-107722 | 4/2001 |
| SE | 1350849 | 1/2015 |
| SE | 537203 | 3/2015 |

OTHER PUBLICATIONS

Written Opinion, PCT/SE2018/050902, dated Nov. 22, 2018.
Extended European Search Report issued in European Patent Application No. 18852910.1 dated May 14, 2021.

\* cited by examiner

INTERNAL COMBUSTION ENGINE AND METHOD FOR CONTROLLING SUCH AN INTERNAL COMBUSTION ENGINE

TECHNICAL FIELD OF THE INVENTION

The present invention relates generally to the field of internal combustion engines suitable for powering a vehicle, such as a car or a truck, a boat, etc., or a machine such as an electric power generator or the like. Further, the present invention relates specifically to an internal combustion engine suitable for a performance car, i.e. a car that is designed and constructed specifically for speed. The internal combustion engine is not restricted to be powered by any specific type of fuel, i.e. both liquid fuel and gaseous fuel are conceivable.

The inventive internal combustion engine comprises a set of combustion chambers, each combustion chamber being provided with a controllable intake valve configured for opening and closing an intake port, a controllable exhaust valve configured for opening and closing an exhaust port, a piston displaceable back and forth in said combustion chamber between a top dead center (TDC) and a bottom dead center (BDC), and a fuel injector. The internal combustion engine further comprises an intake manifold connected to the intake port of each combustion chamber of said set of combustion chambers.

The invention also relates to a method of operating such an internal combustion engine.

BACKGROUND OF THE INVENTION

In internal combustion engines operated in four-stroke cycles, a mixture of air and fuel is provided into a combustion chamber, i.e. cylinder, during an intake stroke. The air-fuel mixture is compressed during a compression stroke, and in connection with the end of the compression stroke the air-fuel mixture is ignited, either by a spark plug or spontaneously due to the compression. The heat and energy released by the burning of the air-fuel mixture causes a further rise in pressure in the combustion chamber which is used to do work against a movable wall of the combustion chamber, i.e. the piston, which work is converted into rotational movement of a crank shaft attached to the piston via a piston rod, during a power stroke. The exhaust gas formed from the burning of the air-fuel mixture is then evacuated from the combustion chamber, during an exhaust stroke, and thereafter a new cycle begins. The cycles of the different combustion chambers of the internal combustion engine are offset in relation to each other.

With rising concerns of the environment and pollution caused by the exhaust gas from internal combustion engines there is a need to lower harmful emissions from internal combustion engines while at the same time maintaining or increasing the efficiency of conversion of the chemical energy in the fuel to kinetic energy of the crankshaft, thereto it is a need to decrease fuel consumption.

In connection with cold starts of an internal combustion engine, i.e. when the catalytic converter of the exhaust discharge arrangement is not warmed up and has not yet reached its working temperature, the catalytic converter cannot fully convert the toxic emissions into less toxic substances. A normal time for igniting a catalytic converter is about 5 minutes, and most of the total pollution from the internal combustion engine is emitted during the warm-up period.

One known way to reduce the warm-up period is to use electric heating coils in the catalytic converter or use a smaller catalytic converter arranged upstream the main catalytic converter. Both these systems requests expensive auxiliary equipment.

OBJECT OF THE INVENTION

The present invention aims at obviating the disadvantages and failings of previously known internal combustion engines and at providing an improved internal combustion engine. A primary object of the present invention is to provide an improved internal combustion engine of the initially defined type generating less toxic emission during cold starts.

It is another object of the present invention is to provide an improved internal combustion engine having a decreased warm-up period of the catalytic converter.

It is another object of the present invention to provide an improved internal combustion engine having decreased heat losses.

It is yet another object of the invention is to provide an improved internal combustion engine having a more stable ignition from cycle to cycle.

It is another object of the present invention to provide an improved internal combustion engine having internal recirculation of exhaust gas, in order to reduce the amount of unburnt fuel reaching the catalytic converter.

SUMMARY OF THE INVENTION

According to the invention at least the primary object is attained by means of the initially defined internal combustion engine and method having the features defined in the independent claims. Preferred embodiments of the present invention are further defined in the dependent claims.

The present invention is a strategy for controlling the operation of an internal combustion engine during a catalytic converter warm-up mode in order to minimize fuel consumption and minimize emissions, during the warm-up period of the catalytic converter.

According to a first aspect of the present invention, there is provided an internal combustion engine of the initially defined type, the internal combustion engine being configured to be operated in a catalytic converter warm-up mode, wherein each combustion chamber is configured to be driven in four-stroke operation comprising a 720 crank angle degrees cycle, wherein the internal combustion engine is configured to perform the following activities: open the intake port, the intake port starting to open in the range 90 to 180 CAD, and close the intake port, the intake port becomes fully closed in the range 180 to 270 CAD, open the exhaust port during the power stroke, the exhaust port starting to open in the range 405 to 495 CAD, open the intake port during the exhaust stroke, the intake port starting to open in the range 610 to 690 CAD, and close the exhaust port during the exhaust stroke, the exhaust port becomes fully closed in the range 630 to 710 CAD, wherein the exhaust gas is forced into the intake manifold by means of the piston, mix fuel and exhaust gas in the intake manifold, and close the intake port, the intake port becomes fully closed in the range 700 to 720+20 CAD.

According to a second aspect of the present invention, there is provided a method for controlling such an internal combustion engine.

Thus, the present invention is based on the insight that by minimizing the mechanical efficiency of the internal combustion engine and maximizing the thermal efficiency of the internal combustion engine, i.e. by having less combustion energy to be converted into kinetic energy and the exhaust gas is expelled from the combustion chamber at a higher temperature, and having internal exhaust gas recirculation, the raw emissions during cold start are reduced and the warm-up period of the catalytic converter is reduced.

According to a preferred embodiment of the present invention, the step of starting to open the intake port during the intake stroke takes place in the range 120 to 180 CAD, even more preferred within the range 150 to 180 CAD. The longer the intake port is closed during the intake stroke the greater under pressure in the combustion chamber before the intake port is opened, and thereby the engine needs to generate more work and thereby more and warmer exhausted gases are generated.

According to a preferred embodiment of the present invention, during the exhaust stroke, the intake port starts to open in the range 665 to 690 CAD and the exhaust port becomes fully closed in the range 675 to 710 CAD. According to a preferred embodiment of the present invention, the method comprises the activity of injecting fuel into the intake manifold, fuel injection taking place in the range that start when the intake port becomes fully closed during the compression stroke, and that stop when the intake port becomes fully closed in connection with the end of the cycle. Preferably, the fuel injection takes place in the range that start when the exhaust port becomes fully closed during the exhaust stroke, and that stop when the intake port becomes fully closed in connection with the end of the cycle. Thereby, the risk of having fuel escaping through the exhaust port is completely eliminated.

According to a preferred embodiment of the present invention, at least two combustion chambers of the set of combustion chambers are activated and at least one combustion chamber of the set of combustion chambers is deactivated when the internal combustion engine is operated in said catalytic converter warm-up mode. Thereby, more exhaust gas having higher temperature is generated in comparison of having all combustion chambers activated.

Further advantages with and features of the invention will be apparent from the other dependent claims as well as from the following detailed description of preferred embodiments.

BRIEF DESCRIPTION OF THE DRAWINGS

A more complete understanding of the abovementioned and other features and advantages of the present invention will be apparent from the following detailed description of preferred embodiments in conjunction with the appended drawing, wherein.

DETAILED DESCRIPTION OF PREFERRED EMBODIMENTS OF THE INVENTION

The present invention relates generally to the field of internal combustion engines suitable for powering a vehicle or a machine. The inventive internal combustion engine, generally designated 1, comprises a set of combustion chambers. The set/plurality of combustion chambers comprises at least two separate combustion chambers 2, also known as cylinders. However, the internal combustion engine 1 may comprise more combustion chambers, such as 3, 4, 6, 8, 10, 12 or 16. Each combustion chamber 2 is preferably cylindrical.

The internal combustion engine 1 is a four-stroke engine, i.e. configured to be driven in four-stroke operation comprising a 720 crank angle degrees (CAD) cycle. The four strokes are "intake" during which air/gas and fuel are delivered into the combustion chamber 2, "compression" during which the air-fuel mixture in the combustion chamber 2 is compressed, "power/combustion" during which the air-fuel mixture is ignited and combusted, and "exhaust" during which the exhaust gas formed by the combustion of the air-fuel mixture is evacuated, also known as scavenged, from the combustion chamber 2. Preferably the internal combustion engine 1 is constituted by a spark-ignition engine, i.e. in which the air-fuel mixture is ignited by a spark from a sparkplug, but may also be constituted by a spontaneous/compression-ignition engine. The internal combustion engine 1 is preferably configured to be driven by petrol/gasoline, but may alternatively be configured to be driven by diesel, gas, ethanol, etc. and/or a mixture of said fuels.

Figure 1:
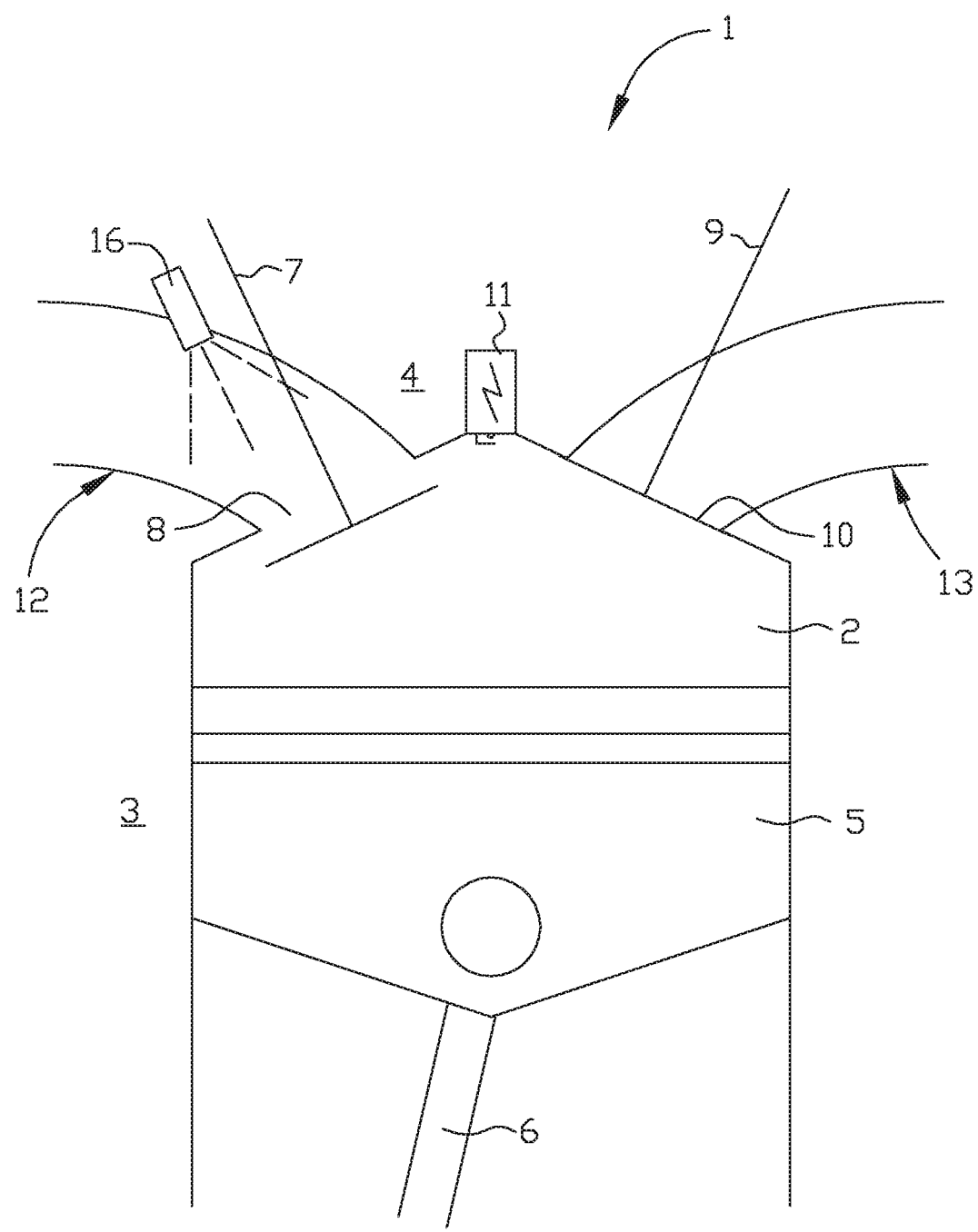
FIG. 1 is a schematic side view of a combustion chamber of an internal combustion engine according to the present invention.
Figure 2:
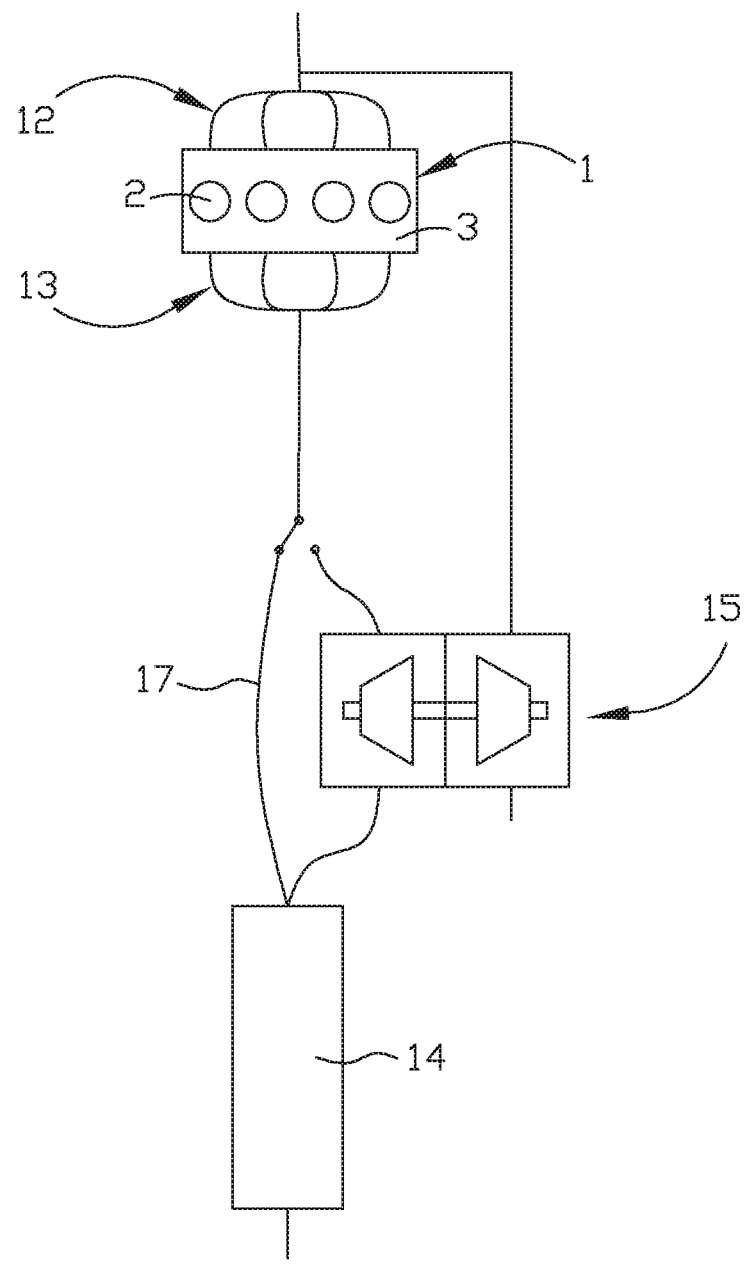
FIG. 2 is a schematic illustration of an internal combustion engine and an exhaust discharge arrangement.

Reference is made to FIG. 1 disclosing a schematic side view of a first embodiment of the inventive internal combustion engine 1, and to FIG. 2 disclosing a schematic illustration of an internal combustion engine and an exhaust discharge arrangement.

The internal combustion engine 1 comprises an engine block 3 provided with said set of combustion chambers or cylinders 2. Each combustion chamber 2 is defined radially by a stationary cylinder wall, and is defined axially by a stationary cylinder head 4 and a displaceable piston 5, respectively. The cylinder head 4 may be releasably connected to the engine block 3 or may be integral with the engine block 3. The piston 5 is configured displaceable back and forth in the axial direction within the combustion chamber 2 between a top dead center (TDC) and a bottom dead center (BDC), and is connected to a revolving crankshaft via a piston rod 6, wherein the linear movement of the piston 5 is converted into rotational movement of the crankshaft. Thus, the volume of the combustion chamber 2 changes cyclically as the piston 5 moves up and down in the cylinder.

Each combustion chamber 2 is provided with at least one controllable intake valve 7 configured for opening and closing an intake port 8, at least one controllable exhaust valve 9 configured for opening and closing an exhaust port 10. Preferably, each combustion chamber 2 comprises two intake ports and two exhaust ports, each port having a controllable valve that preferably are independently controlled. It shall be pointed out that two intake valves and/or the two exhaust valves, respectively, may be operated jointly. Thus, herein the invention is illustrated using one intake valve 7 and one exhaust valve 9, and it shall be realized that in applications having two intake valves and/or exhaust valves these valves can be kept closed or operated jointly with the disclosed valves.

Thereto, in the disclosed embodiment the combustion chamber 2 is provided with a spark plug 11. It shall be realized that the intake port 8, the exhaust port 10 and the spark plug 11 are arranged in the cylinder head 4.

The intake valve 7 and the exhaust valve 9 are preferably of poppet valve type each having a valve stem and a valve disk attached to the lower end of the valve stem. In the closed position the valve disk abuts the material surrounding the corresponding port to prevent passage of fluid through the port, whereas in the open position the valve disc is displaced vertically down into the combustion chamber 2 in order to uncover the port and allow fluid to pass through the port and around the edge of the valve disk. The maximum displacement of the valves is preferably in the range 5-10 millimeters.

Each of the intake valve 7 and the exhaust valve 9 is preferably operated by means of a corresponding valve actuator. Thus, in the context of the present invention a valve actuator allows the corresponding valve to be freely operated without the operation of the valve being slaved to the operation of the internal combustion engine 1, in particular the angular position of the crankshaft of the internal combustion engine, via a camshaft. A controllable valve operated by means of an actuator is for example described in the patent literature documents US2015184558, SE1350849 and SE537203. A controllable valve can be opened and closed at any time and the degree of lift of the valve is not fixed. Thus, the inventive internal combustion engine 1 comprises no camshaft, and is thus camshaft-free. The inventive internal combustion engine 1 is preferably also throttle-free. Preferably, the actuator uses both pneumatic and hydraulic for its operation.

The internal combustion engine 1 comprises an intake manifold 12 for providing air/gas to the combustion chamber 2 from an air intake, and an exhaust manifold 13 for evacuating exhaust gas from the combustion chamber 2 to an exhaust outlet via an exhaust discharge arrangement. Usually at least one muffler (not shown) and/or at least one catalytic converter 14 are arranged adjacent the exhaust outlet, for decreasing the noise of operating of the internal combustion engine and/or for treating the exhaust gas, before the exhaust gas is eventually led off to the atmosphere. Thereto, the exhaust discharge arrangement may comprise a pressure booster 15, constituted by a turbocharger, i.e. a pressure booster driven by exhaust gas.

Air/gas for combustion is supplied to the combustion chamber 2 from the intake manifold 12 via the intake port 8 of each combustion chamber 2 of said set of combustion chambers. Each combustion chamber 2 is provided with an individual intake pipe/runner that is part of the intake manifold 12. The exhaust manifold 13 is connected to the exhaust port 10 of each combustion chamber 2 of said set of combustion chambers. Each combustion chamber 2 is provided with an individual exhaust pipe/runner that is part of the exhaust manifold 13.

The internal combustion engine 1 further comprises an electronic control unit (ECU), wherein the ECU is configured to at least control the opening and closing of the intake valve 7 and the exhaust valve 9, using the corresponding actuators. The internal combustion engine 1 also comprises a sensor for monitoring the rotation of the crankshaft, wherein said sensor is operatively connected to said ECU.

In the disclosed embodiment, a fuel injector 16 is provided in the intake runner/pipe (intake manifold 12) for injecting fuel into the intake manifold 12 towards the intake port 8. In an alternative embodiment the inventive internal combustion engine is provided with direct injection of the fuel into the combustion chambers 2.

As is known to a person skilled in the art a four-stroke internal combustion engine conventionally proceeds through four strokes in one cycle, namely (1) Intake 0 to 180 CAD—this stroke beginning with the piston 5 at its highest position, i.e. top dead center closest to the cylinder head 4, and comprising displacement of the piston 5 downwards while a mixture of gas and fuel is introduced into the combustion chamber 2, (2) Compression 180 to 360 CAD— this stroke beginning with the piston 5 at its lowest position, i.e. bottom dead center, and comprising closing the intake valve 7 and moving the piston 5 upwards towards the cylinder head 4 while compressing the gas-fuel mixture, (3) Power 360 to 540 CAD—igniting the gas-fuel mixture wherein the resulting pressure caused by the combustion of the fuel will displace the piston 5 downwards and away from the cylinder head 4, and (4) Exhaust 540 to 720 CAD— opening the exhaust valve 9 for allowing the exhaust gas formed by the combustion of the gas-fuel mixture to evacuate from the combustion chamber 2 while the piston 5 once more is displaced towards the top dead center. The ignition of the gas-fuel mixture takes place in connection with the piston 5 being located at the upper dead center between the compression stroke and the power stroke.

The inventive internal combustion engine 1 is configured to be operated in at least a catalytic converter warm-up mode, i.e. a cold start mode. According to the inventive method the internal combustion engine 1 is operated in the catalytic converter warm-up mode. The output torque [Nm] of the internal combustion engine 1 is dependent on engine speed [rpm], and the output torque of the internal combustion engine is in this context equivalent with driver/operator requested output torque via an accelerator pedal. During the catalytic converter warm-up mode, the driver/operator usually requests low or moderate output torque via the accelerator pedal.

The ECU is configured to adjust the filling rate of the combustion chambers 2 in view of the engine speed and the requested output torque, i.e. the amount of air/gas going into a combustion chamber 2 in relation to the volume of the combustion chamber. The ECU is also configured for varying the amount of fuel injected into each combustion chamber to provide a suitable relationship, or lambda value, between oxygen and fuel.

The internal combustion engine 1 is configured to shift from catalytic converter warm-up mode to normal mode (i.e. Low/Part Load mode, High Load mode, Sport mode, Economy mode, etc.) when the catalytic converter 14 has reached its working temperature, i.e. when the catalytic converter 14 is ignited. Different sensors upstream and downstream the catalytic converter 14 are used in a conventional way to determine when the catalytic converter 14 is treated as ignited.

The inventive internal combustion engine 1 is configured to perform the inventive method comprising several essential activities/steps. It shall be pointed out that the mutual order of the activities listed in the claims is not entirely delimiting for the invention. The essential activities/steps of the invention are constituted by:

opening the intake port 8, the intake port 8 starting to open in the range 90 to 180 CAD, and closing the intake port 8, the intake port 8 becomes fully closed in the range 180 to 270 CAD, opening the exhaust port 10 during the power stroke, the exhaust port 10 starting to open in the range 405 to 495 CAD, opening the intake port 8 during the exhaust stroke, the intake port 8 starting to open in the range 610 to 690 CAD, and closing the exhaust port 10 during the exhaust stroke, the exhaust port 10 becomes fully closed in the range 630 to 710 CAD, wherein the exhaust gas is forced into the intake manifold 12 by means of the piston 5, mixing fuel and exhaust gas in the intake manifold 12, and closing the intake port 8, the intake port 8 becomes fully closed in the range 700 to 720+20 CAD.

It shall be realized that in addition to the essential activities/steps mentioned above, the operation of the internal combustion engine also comprises suitable/conventional activities/steps, i.e. compression stroke and beginning of power stroke.

Thus, according to the invention the exhaust port 10 becomes fully closed and the intake port 8 starts to open before the piston 5 reaches top dead center during the exhaust stroke. Irrespective of the fuel is added/injected into the intake manifold 12 or into the combustion chamber 2, the substantial mixing of the fuel and gas takes place in the intake manifold 12. During the mixing of the exhaust gas and fuel in the intake manifold, the fuel is evaporated and the exhaust gas is cooled down. Preferably substantially all fuel is injected when the exhaust port 10 is closed, the intake port 8 is open and exhaust gas is pressed into the intake manifold 12 by means of the piston 5. Preferably the fuel injection takes place within 60 CAD, preferably within 40 CAD. Best mixing of the exhaust gas and fuel is achieved if the fuel is injected directly into the flow of exhaust gas that is pressed into the intake manifold 12.

According to the disclosed embodiment the fuel is added/injected into the intake manifold 12 by means of the fuel injector 16, and the fuel injection preferably takes place in the range that start when the intake port 8 becomes fully closed during the compression stroke, and that stop when the intake port 8 becomes fully closed in connection with the end of the cycle. Thus, the fuel can be added/injected after the intake valve 7 has become closed after the intake stroke of the present cycle, either when the intake valve 7 is still closed and/or when the intake port 8 is opened during the exhaust stroke. According to the alternative embodiment the fuel is injected into the combustion chamber 2 by means of the fuel injector 16 when the intake valve 7 is open, the exhaust valve 9 is closed and all the exhaust gas is forced/pressed into the intake manifold 12.

In one embodiment the fuel injection takes place in the range that start when the exhaust port 10 becomes fully closed during the exhaust stroke, and that stop when the intake port 8 becomes fully closed in connection with the end of the cycle. Preferably the fuel injection starts in the range 610 to 670 CAD. Thus, it is preferred to inject the fuel when the intake valve 7 is open during the exhaust stroke and the exhaust gas flow into the intake manifold 12. According to another embodiment the fuel injection takes place in the range that start at 270 and that stop when the intake port 8 starts to open during the exhaust stroke, i.e. all fuel is injected when the intake valve 7 is closed such that all fuel is ready to mix with (be added to) the exhaust gas when the intake valve 7 is opened and the exhaust gas is pressed into the intake manifold 12 by means of the piston 5.

During the power stroke, the exhaust port 10 shall start to open as soon as possible after ignition/combustion of the gas-fuel-mixture in order to evacuate as warm exhaust gases as possible via the exhaust manifold 13 to the catalytic converter 14. However, enough chemical energy of the fuel has to be converted to kinetic energy to be able to turn the crankshaft of the internal combustion engine 1, before the exhaust port 10 starts to open during the power stroke. The internal combustion engine 1 has a predetermined cold start rpm, usually in the range 1000-1500 rpm and for instance 1100 rpm. Upon start of the internal combustion engine 1, the exhaust port 10 is preferably default to open at a predetermined CAD, for instance 450 CAD. Thereafter the ECU determine the actual rpm and if there is a difference between the actual rpm and the predetermined cold start rpm, the moment the exhaust port 10 starts to open is revised. When the actual rpm is too low the exhaust port 10 is kept closed a longer period, and when the actual rpm is too high the exhaust port 10 is kept closed a shorter period. The moment the exhaust port 10 starts to open is preferably altered in steps of 5 CAD. Preferably, this procedure takes place during the entire cold start period. Preferably the exhaust port 10 starts to open in the range 450 to 495 CAD, most preferably in the range 450 to 490 CAD.

According to a preferred embodiment the moment the exhaust port 10 becomes fully closed and the moment the intake port 8 starts to open, takes place within 40 CAD, preferably within 20 CAD. Thus, the valve overlap period shall be as short as possible, but long enough for the exhaust gas to be continuously evacuated from the combustion chamber also during the shift from open exhaust valve 9 to open intake valve 7. Preferably the exhaust port 10 becomes fully closed in the range 630 to 690 CAD, and preferably the intake port 8 starts to open in the range 610 to 670 CAD. Preferably the intake valve 7 starts to open before the exhaust valve 9 is fully closed. Alternatively, it is preferred that the intake port 8 starts to open in the range 665 to 690 CAD, and that the exhaust port 10 becomes fully closed in the range 675 to 710 CAD. It is most preferred that the intake port 8 starts to open in the range 665 to 670 CAD. It is most preferred that the exhaust port 10 becomes fully closed in the range 675 to 690. In order to prevent knocking at the same time as enough internal EGR is achieved during warm-up.

It shall be pointed out that according to a preferred embodiment the volume of the individual intake runner should be big enough to ensure that the exhaust gas pressed into the intake manifold 12 by means of the piston 5 does not slip over into an intake runner of a neighboring combustion chamber 2. Thus, the mixing of the fuel and exhaust gas takes place in the individual intake runner and is sucked into the same combustion chamber during the intake stroke of the following cycle.

In some applications the intake valve 7 can be open or fully open when the piston 5 reaches top dead center, especially gasoline engines, and in some applications the intake valve 7 has to be closed when the piston 5 reaches top dead center in order not to become damaged by the piston 5, especially diesel engines. In the first type applications the intake valve 7 may be kept open past 720 CAD, at most until 720+20 CAD and preferably at most until 720+10 CAD. According the second type application the intake valve 7 has to be fully closed at 710 CAD, and it shall be pointed out that this may also be applied to the first type application. According to the inventive method the intake port 8 is kept closed until at least 90 CAD, preferably until at least 120 CAD and most preferably until at least 150 CAD, in order to create under pressure in the combustion chamber 2, in order for the other combustion chambers to create more work and thereby more and warmer exhaust gas are generated. Thereto, due to the high speed of the gas-fuel mixture when the intake port 8 is open, the combustion chamber 2 is overfilled and thereby more and warmer exhaust gas are generated. Since the exhaust gas and fuel is mixed in the intake manifold, a better and more efficient combustion is obtained generating less emission, and a more stable combustion from cycle to cycle resulting in decreased fuel consumption. Preferably the intake port 8 becomes fully closed in the range 180 to 240 CAD, most preferably in the range 180 to 220 CAD. The earlier the intake port 8 is closed during the compression stroke the higher over pressure is generated, i.e. the engine needs to perform more work.

Preferably not all combustion chambers of the set of combustion chambers of the internal combustion engine 1 are active during the catalytic converter warm-up mode. By having some combustion chambers 2 deactivated, the activated combustion chambers 2 need to perform more work and thereby produces more and warmer exhaust gas. Preferably, at least two combustion chambers 2 of the set of combustion chambers are activated and at least one combustion chamber 2 of the set of combustion chambers is deactivated when the internal combustion engine 1 is operated in said catalytic converter warm-up mode. When a combustion chamber is deactivated it is provided with any fuel. In one embodiment the intake port and the exhaust port of the deactivated combustion chamber are closed the entire cycle.

According to another embodiment the intake port of the deactivated combustion chamber may be operated to be closed during the intake stroke to create under pressure, open shortly in connection with 180 CAD, closed during the compression stroke to create over pressure, open shortly in connection with 360 CAD, closed during the power stroke to create under pressure, open shortly in connection with 540 CAD, closed during the exhaust stroke to create over pressure, open shortly in connection with 720 CAD. Thereby the activated combustion chambers has to perform more work and thereby produces more and warmer exhaust gas.

In the disclosed embodiment the internal combustion engine 1 comprises a pressure booster 15 constituted by a turbocharger, and it is preferred that the exhaust gas evacuated from the combustion chamber 2 via the exhaust port 10 bypass the pressure booster 15, via a bypass 17.

The ECU or similar computer readable medium having stored thereon a computer program product comprises instructions to cause the inventive internal combustion engine 1 to execute the steps of the inventive method.

Feasible Modifications of the Invention

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and thus, the equipment may be modified in all kinds of ways within the scope of the appended claims.

It shall be pointed out that controlling the opening is also to be understood as controlling the closing. Controlling the opening is further to be understood as controlling any of the valve lift, the duration of opening, and when in the operation/cycle of the internal combustion engine the valve is opened.

It shall also be pointed out that all information about/ concerning terms such as above, under, upper, lower, etc., shall be interpreted/read having the equipment oriented according to the figures, having the drawings oriented such that the references can be properly read. Thus, such terms only indicates mutual relations in the shown embodiments, which relations may be changed if the inventive equipment is provided with another structure/design.

It shall also be pointed out that even though it is not explicitly stated that features from a specific embodiment may be combined with features from another embodiment, the combination shall be considered obvious, if the combination is possible.

The invention claimed is:

1. An internal combustion engine (1), comprising:
a set of combustion chambers (2), each combustion chamber (2) being provided with:
    a controllable intake valve (7) configured for opening and closing an intake port (8),
    a controllable exhaust valve (9) configured for opening and closing an exhaust port (10),
    a piston (5) displaceable back and forth in said combustion chamber (2) between a top dead center (TDC) and a bottom dead center (BDC), and
    a fuel injector (16); and
an intake manifold (12) connected to the intake port (8) of each combustion chamber of said set of combustion chambers (2),
wherein the internal combustion engine (1) is configured to be operated in a catalytic converter warm-up mode,
wherein each combustion chamber (2) is configured to be driven in four-stroke operation comprising a 720 crank angle degrees cycle, and
wherein the internal combustion engine (1) is configured to:
    open the intake port (8), the intake port (8) starting to open in a range 90 to 180 CAD, and close the intake port (8), the intake port (8) becomes fully closed in a range 180 to 270 CAD,
    open the exhaust port (10) during the power stroke, the exhaust port (10) starting to open in a range 405 to 495 CAD,
    open the intake port (8) during the exhaust stroke, the intake port (8) starting to open in a range 610 to 690 CAD, and close the exhaust port (10) during the exhaust stroke, the exhaust port (10) becomes fully closed in a range 630 to 710 CAD, wherein the exhaust gas is forced into the intake manifold (12) by means of the piston (5),
    mix fuel and exhaust gas in the intake manifold (12), and
    close the intake port (8), the intake port (8) becomes fully closed in a range 700 to 720+20 CAD.

2. A method for controlling an internal combustion engine (1) that includes a set of combustion chambers (2) and an intake manifold (12), each combustion chamber (2) being provided with:
    a controllable intake valve (7) configured for opening and closing an intake port (8),
    a controllable exhaust valve (9) configured for opening and closing an exhaust port (10),
    a piston (5) displaceable back and forth in said combustion chamber (2) between a top dead center (TDC) and a bottom dead center (BDC), and
    a fuel injector (16),
the intake manifold (12) connected to the intake port (8) of each combustion chamber of said set of combustion chambers (2),
the internal combustion engine (1) being operated in a catalytic converter warm-up mode, wherein each combustion chamber (2) is driven in four-stroke operation comprising a 720 crank angle degrees cycle,
wherein the method comprises:
opening the intake port (8), the intake port (8) starting to open in a range 90 to 180 CAD, and closing the intake port (8), the intake port (8) becomes fully closed in a range 180 to 270 CAD;
opening the exhaust port (10) during the power stroke, the exhaust port (10) starting to open in a range 405 to 495 CAD;
opening the intake port (8) during the exhaust stroke, the intake port (8) starting to open in a range 610 to 690 CAD, and closing the exhaust port (10) during the exhaust stroke, the exhaust port (10) becomes fully closed in a range 630 to 710 CAD, wherein the exhaust gas is forced into the intake manifold (12) by means of the piston (5);

mixing fuel and exhaust gas in the intake manifold (12); and closing the intake port (8), the intake port (8) becomes fully closed in a range 700 to 720+20 CAD.

3. The method according to claim 2, wherein the intake port (8) starting to open in a range 120 to 180 CAD.

4. The method according to claim 2, wherein, during the exhaust stroke, the intake port (8) starts to open in a range 665 to 690 CAD and the exhaust port (10) becomes fully closed in a range 675 to 710 CAD.

5. The method according to claim 2, further comprising:

injecting fuel into the intake manifold (12), the fuel injection taking place in a range that starts when the intake port (8) becomes fully closed during the compression stroke, and that stops when the intake port (8) becomes fully closed in connection with the end of the cycle.

6. The method according to claim 5, wherein the fuel injection takes place in a range that starts when the exhaust port (10) becomes fully closed during the exhaust stroke, and that stops when the intake port (8) becomes fully closed in connection with the end of the cycle.

7. The method according to claim 5, wherein the fuel injection takes place within 60 CAD.

8. The method according to claim 2, wherein the exhaust port (10) starts to open in a range 450 to 495 CAD.

9. The method according to claim 2, wherein the moment the exhaust port (10) becomes fully closed during the exhaust stroke, and the moment the intake port (8) starts to open during the exhaust stroke, takes place within 40 CAD.

10. The method according to claim 2, wherein the intake port (8) starts to open in a range 610 to 670 CAD, and the exhaust port (10) becomes fully closed in a range 630 to 690 CAD.

11. The method according to claim 2, wherein at least two combustion chambers (2) of the set of combustion chambers are activated and at least one combustion chamber (2) of the set of combustion chambers is deactivated when the internal combustion engine (1) is operated in said catalytic converter warm-up mode.

12. The method according to claim 2, wherein the internal combustion engine (1) is further provided with a pressure booster (15) constituted by a turbocharger, and wherein the method further comprises:

evacuating the exhaust gas from the combustion chamber (2) via the exhaust port (10) to bypass the pressure booster (15).

13. A non-transitory computer-readable medium on which is stored a computer program comprising instructions for controlling an internal combustion engine (1), the internal combustion engine comprised of an intake manifold (12) and a set of combustion chambers (2), each combustion chamber (2) being provided with a controllable intake valve (7) configured for opening and closing an intake port (8), a controllable exhaust valve (9) configured for opening and closing an exhaust port (10), a piston (5) displaceable back and forth in said combustion chamber (2) between a top dead center (TDC) and a bottom dead center (BDC), and a fuel injector (16), the intake manifold (12) connected to the intake port (8) of each combustion chamber of said set of combustion chambers (2), the internal combustion engine (1) being operated in a catalytic converter warm-up mode, wherein each combustion chamber (2) is driven in four-stroke operation comprising a 720 crank angle degrees cycle, the instructions of the computer program configured to cause the internal combustion engine to:

open the intake port (8), the intake port (8) starting to open in a range 90 to 180 CAD, and closing the intake port (8), the intake port (8) becomes fully closed in a range 180 to 270 CAD;

open the exhaust port (10) during the power stroke, the exhaust port (10) starting to open in a range 405 to 495 CAD;

open the intake port (8) during the exhaust stroke, the intake port (8) starting to open in a range 610 to 690 CAD, and closing the exhaust port (10) during the exhaust stroke, the exhaust port (10) becomes fully closed in a range 630 to 710 CAD, wherein the exhaust gas is forced into the intake manifold (12) by means of the piston (5);

mix fuel and exhaust gas in the intake manifold (12); and close the intake port (8), the intake port (8) becoming fully closed in a range 700 to 720+20 CAD.

14. The method according to claim 2, wherein the intake port (8) starting to open in a range 150 to 180 CAD.

15. The method according to claim 3, wherein, during the exhaust stroke, the intake port (8) starts to open in a range 665 to 690 CAD and the exhaust port (10) becomes fully closed in a range 675 to 710 CAD.

16. The method according to claim 5, wherein the fuel injection takes place within 40 CAD.

17. The method according to claim 2, wherein the moment the exhaust port (10) becomes fully closed during the exhaust stroke, and the moment the intake port (8) starts to open during the exhaust stroke, takes place within 20 CAD.

18. The method according to claim 3, wherein the exhaust port (10) starts to open in a range 450 to 495 CAD.

19. The method according to claim 4, wherein the exhaust port (10) starts to open in a range 450 to 495 CAD.

20. The method according to claim 5, wherein the exhaust port (10) starts to open in a range 450 to 495 CAD.

* * * * *